April 23, 1968          J. E. KRIETER          3,379,890

FIBER OPTIC READOUT DEVICE AND METHOD FOR MAKING IT

Filed Aug. 21, 1964          2 Sheets-Sheet 1

INVENTOR.
JOHN E. KRIETER
BY
Leon D. Rosen
ATTORNEY

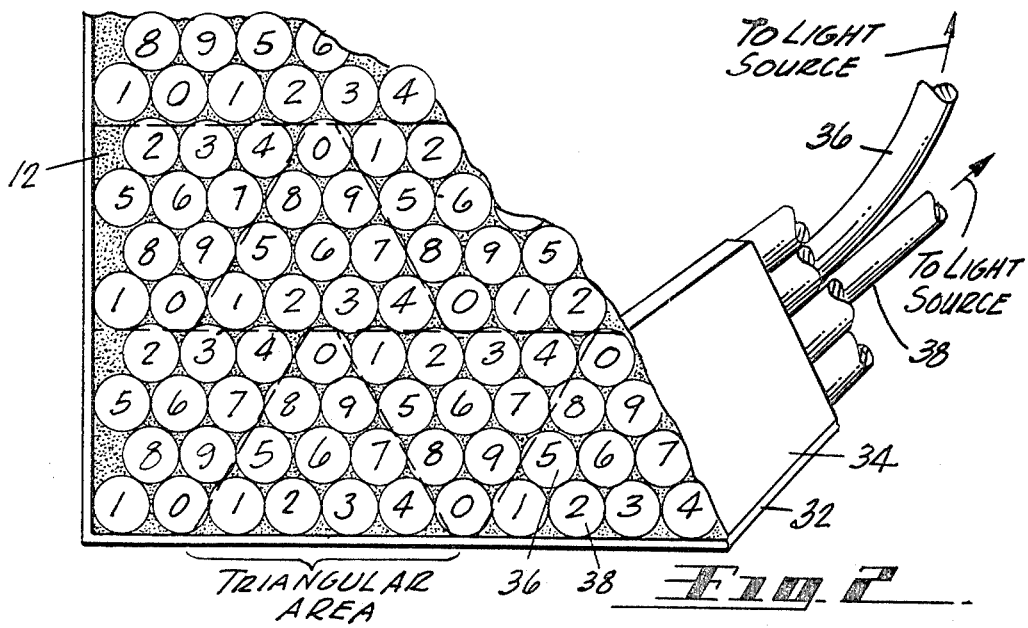
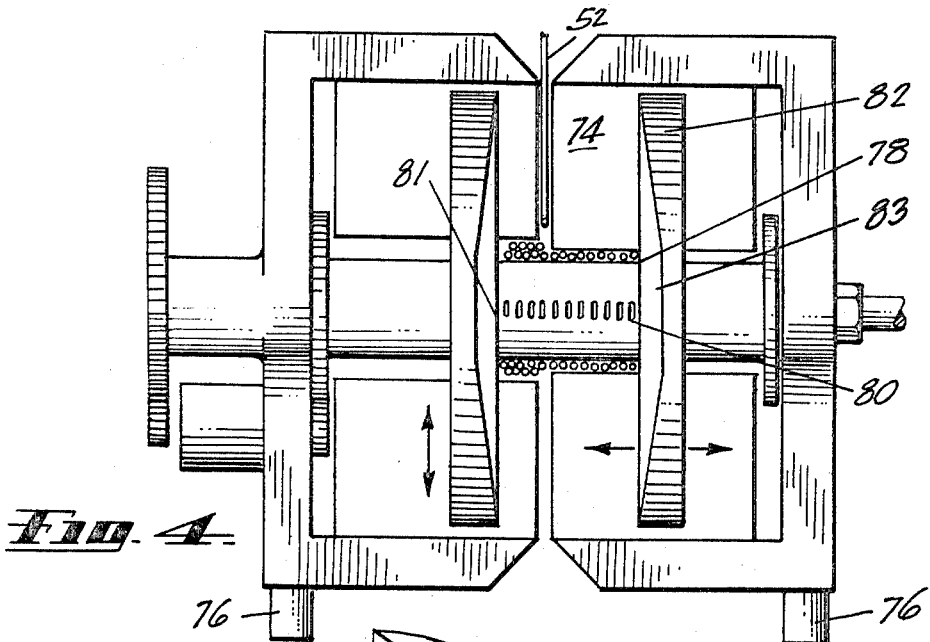
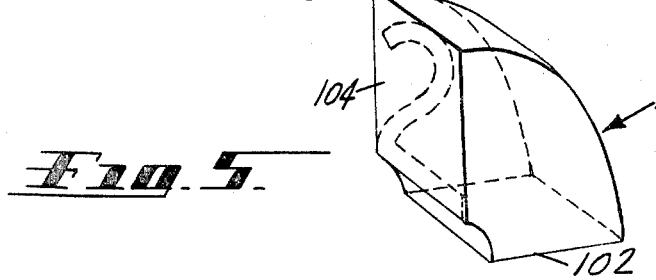

3,379,890
FIBER OPTIC READOUT DEVICE AND METHOD FOR MAKING IT
John E. Krieter, Torrance, Calif., assignor, by mesne assignments, to McDonnell Douglas Corporation, Santa Monica, Calif., a corporation of Maryland
Filed Aug. 21, 1964, Ser. No. 391,257
9 Claims. (Cl. 250—227)

This invention relates to readout devices which utilize arrangements of fiber optics for displaying figures, and to methods for their manufacture.

Digital voltmeters and other instruments utilize readout devices for displaying figures such as numbers or letters. The readout devices often must be capable of rapidly changing the displayed figures, preferably in any order, so that any one of a number of figures may be made to appear in a particular display area. Mechanical means such as rotatable dials with characters printed thereon, and electronic means such as groups of filaments formed in the shape of characters to be displayed and which can be made to glow, have been proposed. However, the readout devices proposed heretofore have generally involved complicated or delicately constructed mechanisms which were not reliable and rugged.

This invention provides a readout device which utilizes numerous small fibers of a coated glass or other light transmitting material to form figures on a display surface. Each fiber carries light from a light source such as a light bulb, to a particular point on the displaying area. A group of fibers which is utilized to display a particular character has one end of each fiber facing a common light source, while the other ends of the fibers extend to a display surface, and are positioned along the display surface so as to define the desired character or character segments. For example, a figure of a vertical line may be created by a group of fibers, all brought together at one end to a common light source such as a light bulb, the fibers in the group laid so that their other ends lie along a vertical line on the display surface.

The construction of the readout devices of this invention generally involve the positioning of numerous small optic fibers along tortuous paths. Accordingly, techniques for accurately and efficiently laying the fibers are of great importance. In accordance with one method of construction of this invention, numerous separate bundles are provided, each generally containing as many separate fibers as there are separate characters to be displayed in any area. For example, numerous bundles of ten fibers each may be used to construct a readout device capable of displaying any digit from 0 to 9. The fiber ends in the bundles which terminate on a display area are held together as a group, while the other ends of the fibers are free so that they can be extended to any one of ten different light sources.

In accordance with another method of the invention, a continuous fiber strand is repeatedly wound through the display area and through the light source areas according to a prearranged program. After many windings, the resulting bundle of fibers is cut across a portion to be used as the display area and across another portion which serves as the areas facing the light sources.

Accordingly, one object of the present invention is to provide a readout device which utilizes optical fibers to form figures.

Another object is to provide rugged and simple fiber optic readout device which utilizes light sources to produce characters, the light sources having no particular shape relationship to the characters.

Another object is to provide a rugged and simple readout device which has character-forming portions having an indefinitely long service life-time.

Another object is to provide relatively simple and reliable methods for manufacturing fiber optic readout devices.

Another object is to provide a method for constructing readout devices utilizing small bundles of fibers, each generally having no more fibers than the number of separate characters to be displayed.

Another object is to provide a method for constructing fiber optic readout devices by utilizing one or several continuous fiber optic strands which are repeatedly wound between light source areas and display areas.

The novel features that are considered characteristic of this invention are set forth with particularity in the appended claims. The invention itself, both as to its organization and method of operation, as well as additional objects and advantages thereof, will be best understood from the following description when read in connection with the accompanying drawings, in which:

FIG. 3 is a pictorial view of apparatus for constructing readout devices in accordance with another method wherein a continuous fiber strand is utilized;

FIG. 4 is a pictorial view of a yoke and bobbin assembly used in the apparatus of FIG. 3; and FIG. 5 is a pictorial view of a fiber optic readout device constructed according to the method of FIG. 3.

Figure 1:
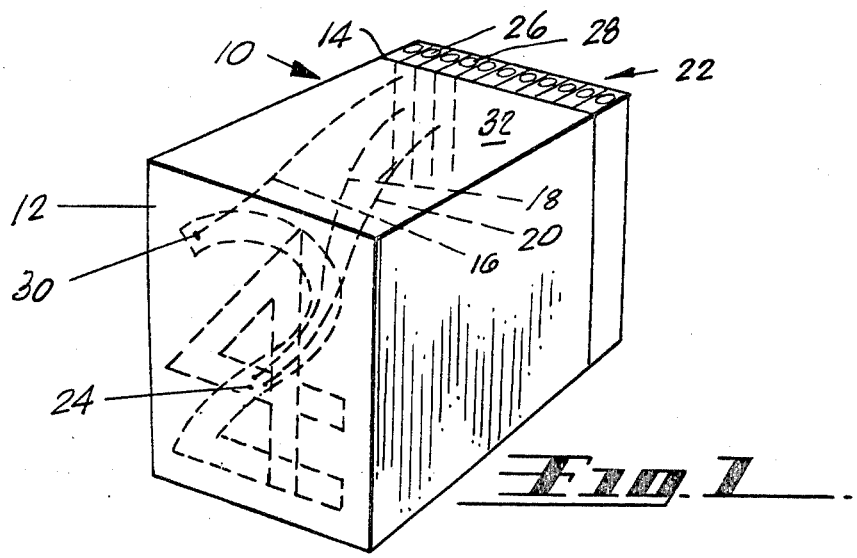
FIGURE 1 is a pictorial view of a readout device constructed in accordance with the invention.

Reference is now made to FIG. 1 which shows a readout device 10 constructed in accordance with the invention. The device includes a display surface 12 upon which is displayed a variety of characters, such as any of the digits 0 through 9. In the particular device shown in FIG. 1, the two digits 2 and 4 are shown displayed in broken lines, though in practice only one digit is normally displayed at one time. The device includes a light receiving or illuminated surface 14 upon which shines lights from any one of ten different light sources 22. Fibers 16, 18 and 20, indicated by broken lines, extend between each area of the display surface 12 and various of the light sources 22. When any one of the light sources 22 is energized or turned on, it illuminates all of the fibers which terminate on the surface 14 adjacent that light source, and the light is carried by the fibers to the points of the display surface 12 to which the fibers extend.

Each portion of the display area 12 includes many optic fibers which may extend to as many as ten different light sources 22. For example, in FIG. 1, the provision for displaying both digits 2 and 4 requires that one area 24 of the display surface, where the digits cross, include fibers 18 and 20 which extend to two different light sources 26 and 28. In another area 30 wherein only the digit 2 is displayed, any fibers which lead to a light source lead to light source 26. When light source 26 is illuminated the digit 2 is displayed on the display surface and when the light source 28 is turned on the digit 4 is displayed on the display surface. Similar provisions are made for each of the other 8 digits which the device of FIG. 1 can display. Those areas which do not display any characters, such as the very corners and edges of the device have fibers which do not lead to any source.

In the device of FIG. 1, the fibers which extend from the display surface to the light sources generally extend in paths which lie in one plane. Thus, for example, all of the portions of optic fiber 16 lie about the same distance from the top surface 32 of the device. By extending the fibers in paths which lie in approximately the same or parallel planes, the device is relatively simple and easy to manufacture.

The light sources 22 may be any one of a number of known sources, such as incandescent lamps or electroluminescent panels. Each light source illuminates a strip of the light receiving surface 14. It is generally desirable to have light uniformly distributed over each strip of the light receiving surface so that each displayed character or digit is uniformly bright. In the case of electroluminescent light sources, uniformity is relatively easy to achieve. In the case of incandescent lamps, uniformity may be achieved by utilizing long filaments extending almost the length of the illuminated strip, and by including reflective and light diffusing lamp enclosures.

Figure 2:
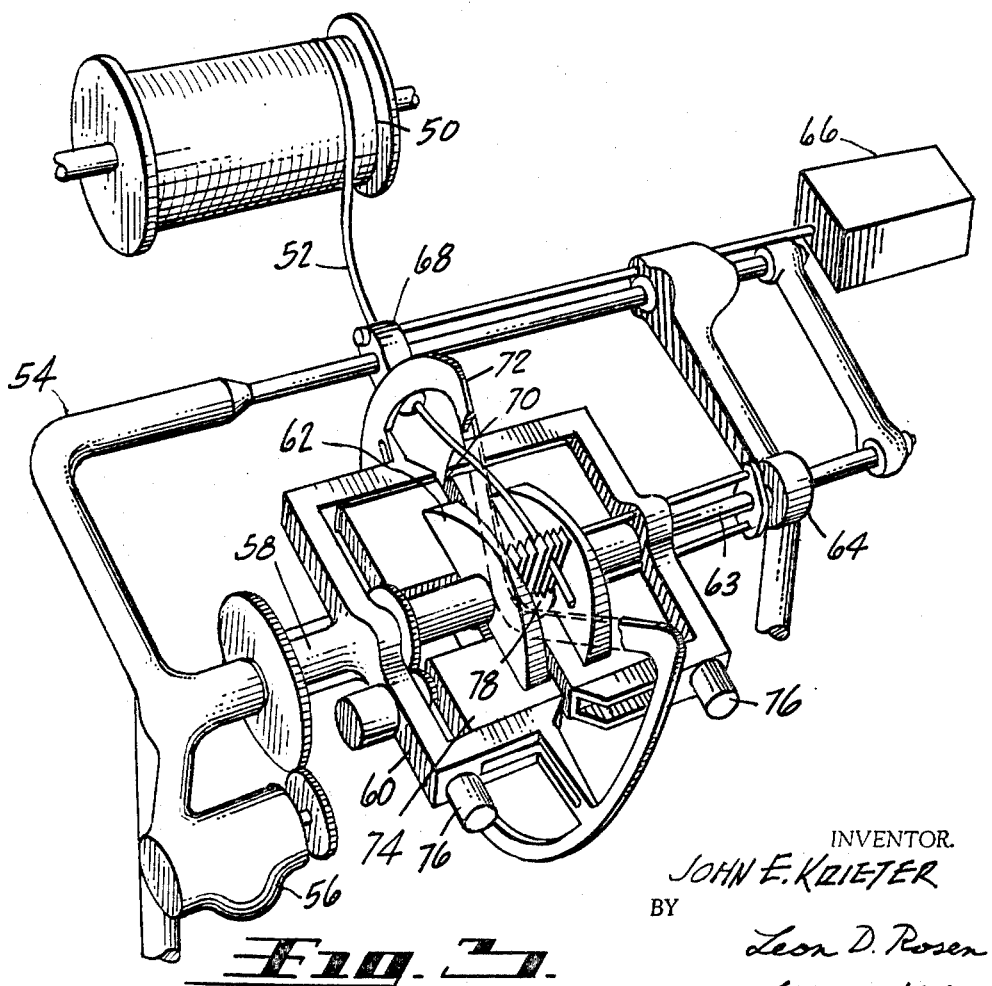
FIG. 2 is a pictorial view illustrating a method for constructing readout devices in accordance with the present invention, which utilizes numerous small bundles of optic fibers.

One method for manufacturing the above-described fiber optic readout device is by the use of many bundles of individual fibers in a manner illustrated in FIG. 2. Each bundle comprises ten fibers held together in a triangular-shaped group at one end 32 thereof, the rest of the fiber lengths being free. In the manufacture of the device, the bundles of ten fibers each are stacked in rows, the portions 32 adjacent to the display surface 12 being glued together with an epoxy or other binder. After each bundle is put in place, the free end of each fiber thereof is extended to one of the ten strips which are illuminated by light sources, or it is cut short. For example, if the bundle 34 of FIG. 2 is in a position of the display surface which is illuminated only when the digits 4 or 2 are to be displayed, only the fibers 36 and 38 are extended to light sources, the other eight fibers being cut short as shown. By cutting short the fibers not being used, the number of fibers which must be crossed over each other in extending them to the light sources is reduced and there is additional room for the crossovers.

After all of the bundles of fibers in a row have been put in place, a new row of bundles is laid in a similar manner; this process is continued until the entire device is built. Then, the entire assembly of fibers, or at least the free ends, are potted with a resin or the like to keep them in their laid positions and make the device rugged.

While bundles of ten fibers each may be used to display ten digits, generally a smaller number will suffice. If, for example, there is no area of the display surface 12 common to more than nine of the digits, then bundles of only nine fibers each will suffice.

In devices constructed according to the method of FIG. 2, only one fiber of each triangular bundle is illuminated when any given light source is turned on. The continuity of the displayed character can be enhanced by making the triangular grouping area of each bundle a diffuser so that light from any fiber is diffused through the entire triangular area. This may easily be accomplished by placing a translucent or transparent material which is ground on both sides, like common ground glass, and having a length on the order of magnitude of one-half the sides of the triangle, in front of the triangular areas. Adjacent triangular faces are light insulated from each other by making the edges of the diffused triangles opaque. The ends of the fibers also may be rounded to aid diffusion.

The method of FIG. 2 is especially adaptable for low quantity production or production where a minimum of equipment is available. Considerable time is involved in constructing any new device inasmuch as each fiber must be individually laid by hand. For higher production, it is desirable to utilize automatic equipment and continuous fiber strands which may be repeatedly wound or laid between the display surface and the illuminated areas. FIG. 3 shows a winding mechanism for utilizing a continuous fiber strand in the production of fiber optic readout devices. In the method utilized in connection with the machine of FIG. 3, a spool 50 of optical glass fiber includes a strand 52 which extends into a winding machine 54. The winding machine has a motor 56 which rotates a spindle 58. The spindle carries a yoke 60 upon which is mounted a bobbin 62 for receiving the fiber 52. In addition to rotational motion, the bobbin 62 is slowly moved back and forth by a traversing mechanism 64 which includes a rod 63 extending to the bobbin. The back and forth motion serves to wind the fiber through every area of the display surface of the final readout device. At the same time that the bobbin 62 is rotating, a shuttle programmer 66 moves a fiber guide 68 in a back and forth motion in a closely controlled manner so as to cause the fiber in each area of the display surface of the final device to extend to the proper light source or light receiving area of the final readout device.

The fiber 52 extends through the fiber guide 68 and is wound onto the bobbin 62. During each revolution of the spindle 58 the fiber 52 passes through a yoke aperture 70 and a slot formed between yoke guides 74 which guide the fiber into the proper display surface area being wound at any time. A cam 72 fixed to the yoke helps to guide the fiber into the yoke aperture 70. The yoke guides 74 also move toward and away from the center of the spindle and serve to guide the fiber from the yoke aperture 70 to the portion of the bobbin wherein the viewing surfaces are being laid down as will be more fully explained hereinafter. Yoke guide motors 76 control the outward movement of the yoke guides.

FIG. 4 shows a detailed view of the yoke and bobbin mechanisms of the machine of FIG. 3. The bobbin includes a winding spool 78 upon which the fibers are wound to produce two or more readout devices. Eleven illuminating area rods 80 project from the spool to separate the various light source areas, which total twelve for a readout device which projects the ten digits 0 through 9. Two of the areas, 81 and 83 which lie on opposite sides of the device, receive fiber portions which terminate in display surface areas which are never illuminated. Two of these areas are provided to minimize the number of crossovers of non-illuminated fibers with others. These areas are removed from the final readout device.

The plane which is to become the display surface of the readout device is positioned at an angle of 90° or a quarter turn from the rods 80. The display surface plane is occupied by the yoke guides 74 to assure that the strand 52 will be laid properly at this plane. As the bobbin 62 turns, it also slowly moves back and forth to stack each winding of fiber so that the fiber portions which extend through the plane of the yoke guides 74 are laid in a predetermined, regular order on the spool.

When the fiber 52 is being wound on the portion of the spool containing the rods 80, the fiber is rapidly positioned to the left or the right by the fiber guide 68 shown in FIG. 3 so as to cause the fiber to lay in any one of the twelve areas between or adjacent the rods 80. By properly programming the guide 68, in relation to the turning of the spindle and the back and forth traversing of the bobbin, the fiber portion extending through each area of the display surface is made to extend to a predetermined one of the twelve areas, ten of which are to be illuminated.

In order for the yoke guides 74 to accurately lay the fiber 52, they extend close to the pile of fibers which has been laid, and must be moved away from the spool as more and more fibers are wound on the spool. Yoke guide motors 76 advance the yoke guides 74 outwardly from the spool 78 a distance of approximately one fiber diameter after each row of fibers is wound on the spool.

The particular characters to be displayed by the readout device and the accurate winding thereof depends to a large extent on the proper programming of the shuttle programmer 66 which moves the fiber guide 68. The programming may be done in a number of ways, as by using magnetic or punch tape which directs the fiber guide 68 to any one of twelve positions along a linear path.

After the bobbin is fully wound, the circle of fibers is removed therefrom and cut along the plane of the yoke guides 74 and the illuminating area rods 80, to form four 90° sections. The two portions of the device which represent the unilluminated areas are generally cut off. Each resulting section has the appearance of the readout segment 100 of FIG. 5, and constitutes the major portion of a fiber readout device. One surface 102 of the device is adapted to be illuminated by ten separate light sources to cause the appearance of one of ten digits on a display surface 104.

Afterwards the display surface faces may be smoothed by grinding and polishing and light sources are added along each of the ten areas of the light receiving surface 102.

The fibers utilized in the readout devices of this invention are generally glass filaments coated with a plastic or glass covering of a lower index of refraction than the filament. If there were no covering, light would pass from one filament to the next at points where they touched. Light rays within the filament which reach the periphery thereof are refracted back toward the center of the filament, if their angle of incidence on the periphery is small (less than a certain critical angle which depends on the relative indices of refraction of the filament and its coating). Thus, light rays from the light sources are repeatedly refracted from side to side as they pass through the filament. Instead of, or in addition to, a glass or plastic coating, a reflective coating, as for example, of silver, can be placed on the outside of the filament.

The diameter of the fibers is preferably of an order of magnitude of several thousandths inch or less. Glass fibers of a larger diameter generally do not possess the high flexibility needed to enable the fibers to cross over one another in a compact device. The small size also obviates the appearance of many small dots instead of a continuous image. Filaments of plastic can be used which have greater flexibility, but they generally do not transmit as great a proportion of light as do glass filaments.

Although an entire character can be produced by illuminating one light source, it is sometimes convenient to lay out the fibers so that each light source illuminates only one segment of a character, or i.e. a character area. Entire characters are displayed by activating several light sources. For example, the letter E can be constructed from one vertical line segment and three horizontal line segments, the letter F can be constructed from the same vertical line segment and two of the same horizontal segments, and the letter L can be constructed from the same vertical line segment and one of the horizontal segments. An alphanumerical readout device containing thirty-eight highly intelligible characters (the digits 0 through 9, twenty-six letters, a decimal point and a minus sign) can be constructed with approximately eighteen segments.

While two different methods of construction have been shown for constructing readout devices, these methods are merely illustrative of the many ways which may be employed to utilize bundles of fibers or one or more continuous strands of fibers to construct readout devices. Furthermore, although particular constructions of readout devices have been illustrated and described, many other types may be designed using optical fibers extending between a display surface and light sources placed nearby. Thus, the particular embodiments of the invention described and illustrated herein are given merely by way of example, and the invention is limited only by a just interpretation of the following claims.

I claim:

1. A readout device comprising:
   a plurality of groups of optic fibers, each fiber having first and second ends remote from each other;
   said first ends of each group of said fibers terminating at a respective portion of a light receiving surface;
   said second ends of said fibers terminating at a common display surface, the second ends of said fibers of each of said groups defining a visual character area at said display surface and the second ends of a group of fibers defining one visual character area interspersed with the second ends of another group of fibers defining a different visual character area whereby the visual character areas defined by different ones of said groups of fibers overlap; and a plurality of light sources each illuminating, when energized, a respective portion of said light receiving surface.

2. A readout device as defined in claim 1 wherein:
   said first ends of said fibers lie in areas defining strips and said fibers extend in paths between said display surface and said light receiving surface which lie substantially in parallel planes.

3. A readout device as defined in claim 1 wherein:
   said second ends of said fibers are bonded together in numerous uniform discrete bundles, at least one fiber from each bundle which lies in an area of said display surface covered by a character area being extended to an area of said light receiving surface associated with said character area.

4. A readout device as defined in claim 3 wherein:
   each of said bundles contains no more than ten fibers, and the fibers extending from each of said areas of said light receiving surface define one of the digits 0 through 9 on said display surface.

5. A readout device comprising:
   a first light source which is selectively energizable;
   a first group of optic fibers having first ends facing said light source and second ends terminating in a common display surface plane, the fibers of said first group arranged with their second ends covering an area of said display surface plane which defines a predetermined character area;
   a second light source which is selectively energizable at times when said first light source is de-energized; and
   a second group of optic fibers having first ends facing said second light source and second ends terminating on said common display surface plane, the fibers of said second group arranged with their second ends covering an area of said surface plane which defines a predetermined second character having areas overlapping said area of said display surface covered by said first predetermined character area, whereby either of said character areas may be made to appear on said surface plane by activation of the light source associated with it.

6. A method for producing a fiber optic readout device and which comprises:
   establishing a plurality of separator means for defining a plurality of separate light receiving areas;
   repeatedly laying a continuous optic fiber strand so that fiber portions thereof lie in rows of fiber portions which extend through a display surface plane spaced from said light receiving areas, each fiber portion of said rows being generally laid adjacent the next preceding laid fiber portion;
   extending said fiber strand selectively between said separator means between the laying of each of said fiber portions at said display surface;
   severing said fiber portions across a surface which passes through said light receiving areas;
   severing said fiber portions along said display surface plane; and
   establishing light sources in illuminating relationship with said light receiving areas.

7. A method for producing a fiber optic readout device as defined in claim 6 including:
   extending a plurality of fibers which are not to be illuminated, from said display surface to a non-illuminated-fibers-area which is adjacent said separator means and which lies to one side of said light receiving areas; and
   severing said non-illuminated-fibers-area from the rest of said readout device.

8. Means for producing a fiber optic readout device, comprising:
- spindle means including a yoke adapted to be rotated on a yoke axis;
- a bobbin mounted in said yoke on said yoke axis and rotated with said yoke, said bobbin being further adapted to be translated back and forth on said yoke axis in a predetermined relationship to the rotation of said yoke;
- yoke guides mounted to said yoke and establishing a display surface plane;
- separators positioned axially in said bobbin in an illuminating area plane angularly spaced from said display surface plane, said separators dividing an axial length of said bobbin at said illuminating area plane into separate sections;
- fiber guide means movable on a guide axis parallel and spaced apart from said yoke axis, said fiber guide means being rotated with said yoke;
- a supply of a continuous optic fiber supplying said fiber through said fiber guide means to be wound on said bobbin; and
- a programmer for rapidly positioning said fiber guide means in a predetermined relationship to the rotation of said yoke and the translation of said bobbin whereby placement of said fiber in the separate sections on said bobbin is programmed for each rotation of said yoke and correlated to the translation of said bobbin.

9. Means as defined in claim 8 wherein said yoke guides are radially movable away from said yoke axis as additional layers of said fiber are wound upon said bobbin.

References Cited

UNITED STATES PATENTS

| | | | |
|---|---|---|---|
| 2,931,739 | 4/1960 | Marzocchi et al. | 88 |
| 3,043,179 | 7/1962 | Dunn | 250—227 |
| 3,177,470 | 4/1965 | Galopin | 88—1 |
| 3,215,029 | 11/1965 | Woodcock | 250—227 |
| 3,216,807 | 11/1965 | Woodcock | 88—1 |

RALPH G. NILSON, *Primary Examiner.*

WALTER STOLWEIN, *Examiner.*

M. ABRAMSON, *Assistant Examiner.*